United States Patent [19] — Goode, III
[11] 4,435,648
[45] Mar. 6, 1984

[54] AUTOMOTIVE ACCESSORY CONTROL SYSTEM

[75] Inventor: Joseph W. Goode, III, Carmel, Ind.

[73] Assignee: Emhart Industries, Inc., Indianapolis, Ind.

[21] Appl. No.: 452,071

[22] Filed: Dec. 22, 1982

[51] Int. Cl.[3] .............................................. H02J 1/00
[52] U.S. Cl. ............................ 307/10 R; 307/10 LS; 364/424; 340/53; 340/76
[58] Field of Search .................. 307/10 R, 10 CS, 32, 307/38, 126; 364/424; 340/53, 54, 56, 76

[56] References Cited

U.S. PATENT DOCUMENTS

| | | | |
|---|---|---|---|
| 4,139,801 | 2/1979 | Linares | 307/10 LS X |
| 4,306,218 | 12/1981 | Leconte et al. | 364/424 X |
| 4,348,726 | 9/1982 | Igarashi et al. | 364/424 |

*Primary Examiner*—E. A. Goldberg
*Assistant Examiner*—Derek Jennings
*Attorney, Agent, or Firm*—Robert F. Meyer

[57] ABSTRACT

An automotive accessory control system provides a single, centralized electronic control circuit for automatic switching of exterior lighting, intermittent windshield wiper operation, electric window defogger control and instrument panel lighting control.

5 Claims, 1 Drawing Figure

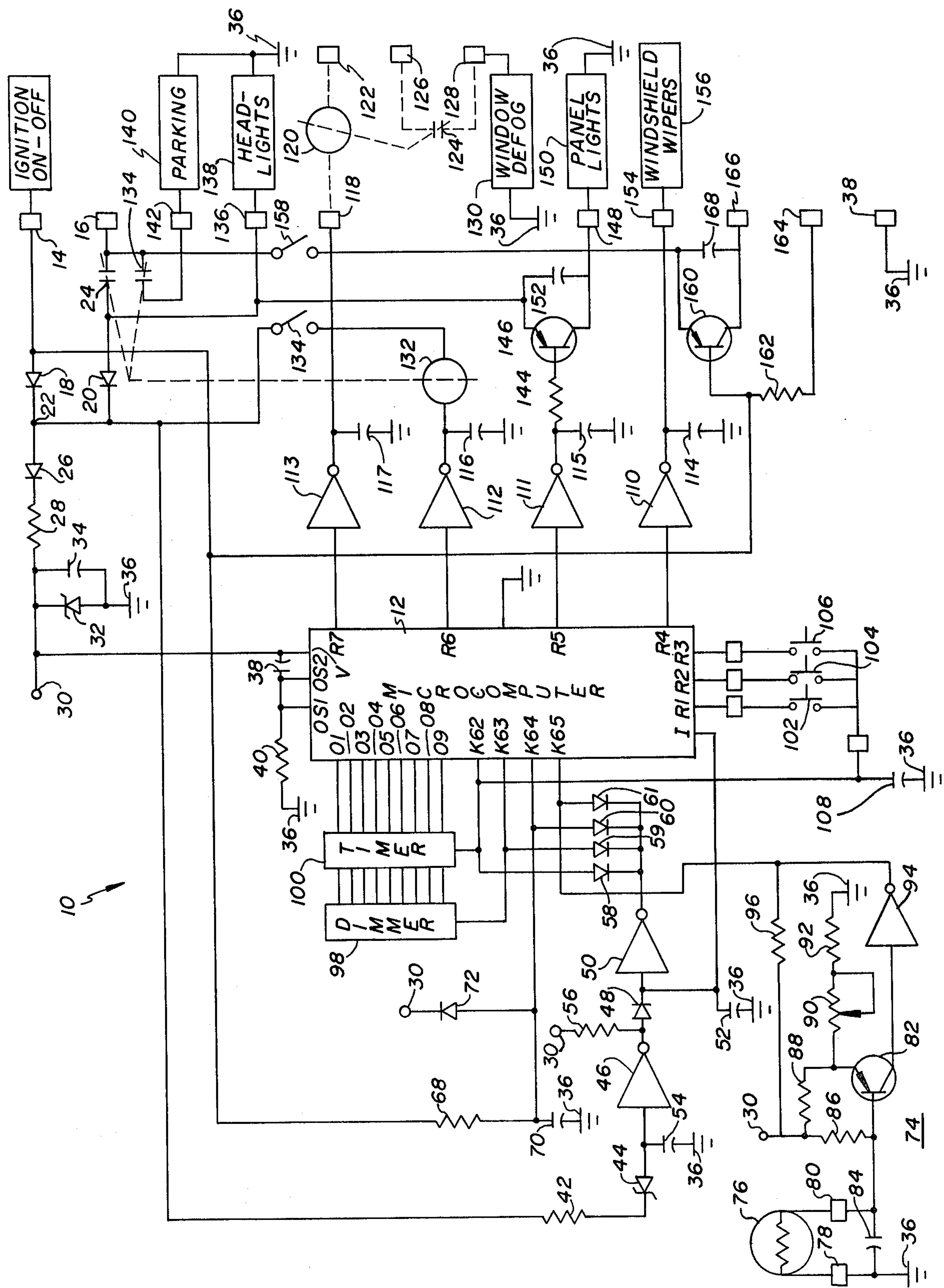
IGNITION ON-OFF
PARKING
HEAD-LIGHTS
WINDOW DEFOG
PANEL LIGHTS
WINDSHIELD WIPERS
MICROCOMPUTER
TIMER
DIMMER

AUTOMOTIVE ACCESSORY CONTROL SYSTEM

BACKGROUND OF THE INVENTION

1. Field of the Invention

The present invention generally relates to automotive accessory control systems and, in particular, to such systems using microcomputer control means.

2. Statement of the Prior Art

Electronic circuits have previously been used in automative accessory controls such as automatic headlight controls, intermittent windshield wiper operation, electrical window defogger timer, and others. Such applications have included separate installations of electronic circuitry for each function control. Such an approach is disadvantageous for numerous reasons, most of which concern higher production costs.

SUMMARY OF THE INVENTION

Accordingly, the present invention provides a centralized automotive accessory control system which includes accurate and reliable electronic control of a plurality of accessories by a single electronic installation. The automotive accessory control system of the present invention is for a vehicle having an on-off switch, exterior lighting means, windshield wiper means, electrical window defogger means and instrument panel lighting means, and comprises: first relay means for energizing the exterior lighting means; second relay means for energizing the windshield wiper means; third relay means for energizing the electrical window defogger means; semiconductor switch means for determining the amount of electrical energy coupled to the instrument panel lighting means; light detector means for monitoring ambient light conditions around the vehicle; first switch means for selecting automatic activation and deactivation of the exterior lighting means in response to the light detector means; second switch means for selecting a delay period for the automatic activation and deactivation of the exterior lighting means; third switch means for selecting intermittent operation of the windshield wiper means; fourth switch means for selecting operation of the window defogger means; fifth switch means for selecting a brightness level for the instrument panel lighting means; and microcomputer control means for activating and deactivating the first relay means in response to the ambient light conditions monitored by the light detector means and in response to the first and second switch means and the on-off switch, for momentarily activating the second relay means in response to a first activation of the third switch means, for determining a period for intermittent operation of the windshield wiper means in response to the first and a second activation of the third switch means, for momentarily activating the second relay means periodically in accordance with the period for intermittent operation, for activating the third relay means for a predetermined period of time in response to activation of the fourth switch means, and for activating the semiconductor switch means to determine the amount of electrical energy coupled to the instrument panel lighting means in response to the brightness level selected by the fifth switch means.

BRIEF DESCRIPTION OF THE DRAWING

The present invention is illustratively described in respect to the accompanyiing FIGURE which is a schematic diagram of one embodiment of the present invention.

DETAILED DESCRIPTION OF THE DRAWING

The drawing shows a control circuit 10 generally including a microcomputer 12 and a plurality of input and output circuits therefor. Operating power is supplied by a pair of terminals 14 and 16. The terminal 14 is connected to an ignition switch and the terminal 16 is connected to a battery. Terminals 14 and 16 are coupled through isolation diodes 18 and 20, resepctively, to a common voltage point 22. A pair of relay contacts 24 is connected between the terminal 16 and its isolation diode 20, and the purpose therefor is explained below. A ground terminal 36 for the control circuit 10 is connected via a terminal 38 to the automobile ground.

A further isolation diode 26 connects voltage point 22 through a resistor 28 to a power supply terminal 30 for the circuit 10. A typical voltage for power supply terminal 30 is 9 volts. A voltage regulating zener diode 32 and a filter capacitor 34 are coupled in parallel between voltage point 30 and ground terminal 36. The voltage supply terminal 30 is connected directly to the voltage input terminal V of microcomputer 12. A capacitor 38 couples terminal 30 to the oscillator OS1 and the oscillator OS2 inputs of microcomputer 12. A resistor 40 connects these oscillator inputs to the system ground 36.

The voltage point 22 is also connected through a resistor 42 and a reversed biased zener diode 44 to the input of an inverter 46. The output of inverter 46 is coupled through a diode 48 to the input of another inverter 50. The input for inverter 50 is also connected to the initialization input I of microcomputer 12 and through a capacitor 52 to the system ground 36. Another capacitor 54 is connected between the input of inverter 46 and the system ground 36, and a resistor 56 is connected between the output of inverter 46 and the power supply terminal 30. The output of inverter 50 is connected by diodes 58 through 61 to separate K-inputs K62 through K65, respectively, of microcomputer 12.

The purpose of the previously described components is to initialize the microcomputer 12. Resistor 42 and capacitor 54 serve as transient protection. Zener diode 44 only allows initialization while the voltage from terminal 22 is below the reverse bias breakdown voltage of the diode 44. During this time, the output of inverter 46 is high which causes the charging of capacitor 52 in accordance with the combination of its value and the value of resistor 56. Also during this time, the output of inverter 50 is low which holds the inputs K62 through K65 low. When capacitor 52 becomes sufficiently charged, the microcomputer is initialized via its input I.

The input terminal 14 from the ignition switch of the vehicle is also coupled through a resistor 68 to input K64 of microcomputer 12. A capacitor 70 couples input K64 to the system ground 36 and a diode 72 couples input K64 to the power supply terminal 30. Resistor 68 and capacitor 70 filter out transients, and diode 72 clamps the input voltage of input K64 to the 9-volt power supply voltage of terminal 30.

The input K65 is connected to a light detector circuit 74 which uses a photo cell 76 to detect ambient light conditions around the vehicle. The photo cell 76 is connected via a terminal 78 to the system ground 36 and via a terminal 80 to the base of a transistor 82. A noise filtering capacitor 84 is connected in parallel with the photo cell 76. A resistor 86 connects the terminal 80 of phot cell 76 to the voltage supply point 30. Another resistor 88 connects the voltage supply point 30 to the emitter of transistor 82. A variable resistor 90 and a fixed resistor 92 are connected in series and connect the emitter of transistor 82 to the system ground 36. An inverter 94 has an input connected to the collector of transistor 82 and its output connected via a resistor 96 to the positive voltage supply point 30 and to the K65 input of microcomputer 12. In operation, the photo cell 76 and the resistor 86 operate as a voltage divider circuit. As ambient light conditions increase, the resistance of photo cell 76 decreases which causes the voltage at the base of transistor 82 to drop. When this voltage is approximately 0.7 volts below the emitter voltage, the transistor 82 turns on and supplies a logical high voltage to the input of inverter 94. The output of inverter 94 then goes to a logical zero which is inputted to the microcomputer through the K65 input. The resistor 96 serves to raise the output of inverter 94 to a logical high when it is not being held at a logical low. The variable resistor 90 allows variation of the bias point for the switching of transistor 82 to allow adjustment of the amount of ambient light conditions at which the light detector circuit 74 gives an indication.

The K63 input is connected to a common terminal of a selector switch 98 which serves the purpose of a dimmer for the instrument panel lights of the vehicle. The dimmer 98 is also connected to a plurality of outputs for microcomputer 12. The outputs are 01 through 09 and the setting of the dimmer 98 connects the common input line from K63 to any one of the 01 through 09 outputs.

The K62 input is multiplexed between a timer switch 100 and a plurality of selector switches 102, 104 and 106. The connection to the timer switch 100 is a common input for a multiple selector switch, the outputs of which are also connected to the 01 through 09 outputs of microcomputer 12.

The K62 through K65 inputs of microcomputer 12 are input terminals. Via the connections described for outputs 01 through 09, the microcomputer 12 may pulse these terminals at different points in time and by monitoring the inputs K62 and K63 during the same period of time determine the settings for both the dimmer selector 98 and the timer selector 100. The K62 input is also connected through the switches 102, 104 and 106 to individual R outputs of microcomputer 12. Via these connections, the microcomputer can pulse the R1 through R3 output terminals and by monitoring the K62 input terminal, determine whether any of the switches 102, 104 or 106 is closed. Switches 102, 104 and 106 are normally open push button switches. A capacitor 108 is connected between the common terminal of switches 102, 104 and 106 and the system ground 36 for the purpose of noise reduction.

R terminals R4 through R7 are used as output terminals for controlling the various automotive accessories. Each of the R terminals R4 through R7 is connected to the input of a separate current amplifying inverter 110 through 113, respectively. Capacitors 114 through 117 are connected respectively from the outputs of inverters 110 through 113 to the system ground 36 as a form of over-voltage protection for the outputs thereof. The output of terminal R7 is connected through a connector 118 to one side of a relay coil 120. The other side of relay coil 120 is connected through a terminal 122 to the ignition switch of the vehicle. A pair of relay terminals 124 are controlled by the relay coil 120 and are connected via a pair of connectors 126 and 128 between the vehicle battery (not shown) and the rear window defogger 130 which has its other input connected to the vehicle ground. Thusly, upon a logical high appearing at the R7 output of microcomputer 12, the output of inverter 113 goes to ground causing energization of the relay coil 120 and closing of the contact 124 to energize the rear window defogger 130.

The output of inverter 112 is connected to one end of a coil for a relay 132. The other end of the coil therefor is connected to one terminal of a switch 134, the other terminal of which is connected to the voltage supply point 22. A pair of relay contacts 24 and 134 are controlled by the relay coil 132. The contacts 24 are connected between the battery terminal 16 and a terminal 136 which is connected to the vehicle headlights 138. The contacts 134 are connected between the battery terminal 16 and a terminal 142 which is connected to the parking lights 140. Both headlights 138 and parking lights 140 have secondary terminals connected to the vehicle ground 136. Upon a logical high appearing at the R6 output terminal of microcomputer 12, the output of inverter 112 becomes a logical zero. If this occurs while the switch 134 is closed, the relay 132 will be activated closing contacts 24 and 134 to energize the headlights 138 and parking lights 140.

The output of inverter 111 is connected through a resistor 144 to the base of a PNP transistor 146. The emitter of transistor 146 is connected to the headlight terminal 136 and the collector of transistor 146 is connected to an output terminal 148. The terminal 148 is connected to panel lights 150 which is also connected to the vehicle ground 36. Thusly connected, a logical high at the R5 output of microcomputer 12 will cause the activation of the instrument panel lights whenever the headlights are activated. A capacitor 152 is connected between the emitter and collector of transistor 146 for the purpose of voltage transient protection.

The output of inverter 110 is connected through a terminal 154 to the vehicle windshield wipers 156. Activation of windshield wipers 156 may be by any suitable method such as by means of a relay.

The previously described functions of headlight timer, window defogger, windshield wiper and instrument panel lighting are controlled by the microcomputer 12 in response to the various input switches and sensors described. The microcomputer 12 includes an instruction program therein which tests its various inputs on a periodic basis and controls the outputs thereof in response thereto. Various programs may be designed by persons skilled in the art for use with the present circuit and for controlling the related accessories in the following manner. When the ignition or on-off switch 14 connects electrical power to terminal 14, the K64 input of microcomputer 12 is energized to a logical high and the microcomputer 12 is initialized by the proper signal at the I input thereof while the K62 through K65 inputs are held to a logical high. The microcomputer begins sensing input terminals K62, K63 and K65. By pulsing output terminals 01 through 09 at different times and simultaneously sensing intputs K62 and K63, microcomputer 12 can determine the setting for the dimmer switch 98 and the timer switch 100. When a logical high is sensed at the K62 input with R1 output high indicating a closure of switch 102, microcomputer 12 knows that the window defogger function has been selected and can act accordingly.

When a logical high is first sensed at the K62 input with R2 output high, microcomputer 12 knows that the intermittent operation for the windshield wipers has been selected. The microcomputer 12 then begins to measure time from the initial activation of the K62 input to determine the selected period for intermittent windshield wiper operation. Upon a second activation of switch 104 or upon lack of a second activation thereof within a known predetermined time period, the microcomputer determines the period between intermittent windshield wiper operation by setting it equal to the period of time between activations of the switch 104 of by setting it equal to the predetermined period of time in the event that a second activation of the switch 104 is not sensed within the predetermined period from the initial activation thereof. By thes means, the driver of the vehicle may set the period for intermittent operation at whatever period is best suited for the accumulation of precipitation on the windshield. In the event that the operator forgets to determine a period for operation, the microcomputer causes the windshield wipers to be activated at a predetermined period. Upon sensing of a logical high at the R3 output and K62 input indicating a closure of switch 106, microcomputer 12 causes deactivation of either or both of the window defogger or the windshield wiper.

The microcomputer 12 uses its R7 outout for controlling the window defogger means 130. The R7 output remains at a logical high during the entire period of time for which the window defogger means 130 is to be activated. This high causes activation of relay coil 120 and closure of contacts 124 which energizes the defogger means 130.

The mircocomputer uses terminal R6 for controlling the headlight timer switching means of relay coil 132 and contacts 24 and 134. The microcomputer senses whether the K65 input is a logical high or a logical low. A logical low indicates insufficient ambient light conditions which causes the microcomputer to generate a signal which would energize the lighting means for the vehice after a predetermined amount of time as indicated by the timer switch 100. When the ambient light conditions reach a level which corresponds to the setting of variable resistor 90, a logical high is connected to microcomputer 12 via the K65 input. Microcomputer 12 then begins a delay period equal to the time indicated by timer switch 100. At the end of this delay period, a logical high is generated at the R6 output. If the timer selector switch 134 is closed at this time, the logical high at the R6 output causes activation of the relay coil 132 and closure of contacts 24 and 134.

Contacts 24 and 134 are used to split the current load between the parking lights 140 and the headlights 138. Once the contacts 24 are closed, power is supplied to voltage point 22 through diode 20 from the battery connected to terminal 16. This allows the microcomputer to function in the timer mode once the ignition or on-off switch has been opened. When the vehicle operator parks the vehicle and switches off the on-off ignition switch, the microcomputer senses this via its K64 input and continues to function by the power connected via diode 20. The computer measures the delay time indicated again by the timer switch 100. At the end of this delay period, microcomputer 12 deactivates the R6 output causing deactivation of relay coil 132 and opening of contacts 24 and 134. This allows the vehicle operator to leave the vehicle lights on as he or she leaves the vehicle and shuts the lighting means off after a predetermined time period has elapsed. At this point because the contacts 24 are opened, the microcomputer 12 is also deactivated.

The timing function also serves as a delay to prevent the activation or deactivation of the leadlights in response to tunnels encountered while driving. Should the vehicle enter a tunnel during daylight and while the switch 134 is closed, the microcomputer 12 will not switch on the headlights immediately, but will delay by the time period indicated on timer switch 100. This will allow the vehicle time to exit the tunnel and avoid activation of the headlights. Likewise, if lighting conditions in a tunnel should be sufficiently bright to deactivate headlights during night-time driving, the delay period incorporated by timer switch 100 would allow the vehicle time to exit the tunnel prior to deactivation of the headlights.

The instrument panel lights are controlled by the R5 output of microcomputer 12. When the headlights 138 are activated, power for the panel lights is derived via a connection to terminal 136 from the emitter of transistor 146. A logical high at the R5 output switches on transistor 146, which energizes the panel lights 150. The microcomputer 12 senses the setting of the dimmer switch 98 and accordingly energizes the R5 output with a pulse signal having a duty cycle indicative of the setting of timer 98. Thus if the dimmer 98 is set at full bightness, the output of terminal R5 appears as a constant logical high and does not switch to a logical low. Likewise when the dimmer 98 is set at the dimmest lighted position, the output of terminal R5 appears as a very low duty cycle pulse signal to energize the panel lighting means 150 accordingly.

The microcomputer 12 uses the R4 output to energize the windshield wipers 156. As most windshield wipers generally include switch means therein to sustain operation at least through a complete cycle once initial activation is given, the output of terminal R4 is generally just a single square wave pulse for the initiation of operation in the intermittent operation mode. Constant operation for the windshield wipers 156 and operation at different speeds therefor would normally be selected by a separate selector switch (not shown).

Lastly, the circuit 10 includes switching means for a signalling device when the headlights are left switched on and the ignition is turned off and the door is open. A switch 158 is connected to battery terminal 16 and has its other contact connected to the emitter of a transistor 160. The base of transistor 160 is connected to the ignition input terminal 14 and through a resistor 162 to a terminal 164 for connection to ground through a door switch (not shown). The collector of transistor 160 is connected to a terminal 166 for connection to a signalling device A capacitor 168 is connected between the emitter and collector terminals of transistor 160 for noise supression purposes. When the driver's door of the vehicle is open, the terminal 164 is connected to ground. When the ignition switch is turned off, the base of transistor 160 goes to ground potential by the resistor 162. Operation of the manual headlight or parking light switch causes closure of switch 158 which supplies a positive voltage to the emitter of transistor 160. When the base thereof goes to ground potential, transistor 160 switches on, connecting positive voltage to the terminal 166 to activate any alarm connected thereto.

The above invention is illustratively described in respect to the embodiment shown. Various modifications and changes may be made to the described embodiment by persons skilled in the art without departing from the scope of the present invention as described in the appended claims.

What is claimed is:

1. An automotive accessory control system for a vehicle having an on-off switch, exterior lighting means, windshield wiper means, electrical window defogger means and instrument panel lighting means, comprising:

first relay means for energizing said exterior lighting means;

second relay means for energizing said windshield wiper means;

third relay means for energizing said electrical window defogger means;

semiconductor switch means for determining the amount of electrical energy coupled to said instrument panel lighting means;

light detector means for monitoring ambient light conditions around said vehicle;

first switch means for selecting automatic activation and deactivation of said exterior lighting means in response to said light detector means;

second switch means for selecting a delay period for said automatic activation and deactivation of said exterior lighting means;

third switch means for selecting intermittent operation of said windshield wiper means;

fourth switch means for selecting operation of said window defogger means;

fifth switch means for selecting a brightness level for said instrument panel lighting means; and microcomputer control means for activating and deactivating said first relay means in response to the ambient light conditions monitored by said light detector means and in response to said first and second switch means, and said on-off switch, for momentarily activating said second relay means in response to a first activation of said third switch means, for determining a period for intermittent operation of said windshield wiper means in response to said first and a second activation of said third switch means, for momentarily activating said second relay means periodically in accordance with said period for intermittent operation, for activating said third relay means for a predetermined period of time in response to activation of said fourth switch means, and for activating said semiconductor switch means to determine the amount of electrical energy coupled to said instrument panel lighting means in response to the brightness level selected by said fifth switch means.

2. The control system of claim 1, further comprising sixth switch means coupled to said microcomputer control means for selecting termination of intermittent windshield wiper means operation and termination of energization of said window defogger means.

3. The control system of claim 1, wherein said microcomputer control system determines said period for intermittent operation by the interval of time between said first and second activations of said third switch means up to a maximum second predetermined period and sets said period for intermittent operation at said second predetermined period for said intervals equal to or longer than said second predetermined period.

4. The control system of claim 1, wherein said microcomputer control means deactivates said first relay means after said delay period upon deactivation of said on-off switch.

5. The control system of claim 1, wherein said microcomputer control means includes pulsewidth control means for activating said semiconductor switch means to determine the amount of electrical energy coupled to said instrument panel lighting means in response to the brightness level selected by said fifth switch means.

* * * * *